(12) United States Patent  
Doveri

(10) Patent No.: US 10,408,311 B2
(45) Date of Patent: Sep. 10, 2019

(54) CHAIN-TENSIONING ROD

(71) Applicant: PIAGGIO & C. S.P.A., Pontedera (PI) (IT)

(72) Inventor: Stefano Doveri, Pontedera (IT)

(73) Assignee: PIAGGIO & C. S.P.A., Pontedera (PI) (IT)

(*) Notice: Subject to any disclaimer, the term of this patent is extended or adjusted under 35 U.S.C. 154(b) by 1 day.

(21) Appl. No.: 15/320,939

(22) PCT Filed: Jul. 30, 2015

(86) PCT No.: PCT/IB2015/055766
§ 371 (c)(1),
(2) Date: Dec. 21, 2016

(87) PCT Pub. No.: WO2016/016836
PCT Pub. Date: Feb. 4, 2016

(65) Prior Publication Data
US 2017/0152923 A1 Jun. 1, 2017

(30) Foreign Application Priority Data

Aug. 1, 2014 (IT) .............................. RM2014A0450
Aug. 1, 2014 (IT) .............................. RM2014A0451

(51) Int. Cl.
*F16H 7/08* (2006.01)
*F16H 7/18* (2006.01)

(52) U.S. Cl.
CPC ................. *F16H 7/08* (2013.01); *F16H 7/18* (2013.01); *F16H 2007/0804* (2013.01); *F16H 2007/0872* (2013.01); *F16H 2007/0893* (2013.01)

(58) Field of Classification Search
CPC ...... F16H 7/08; F16H 7/88; F16H 2007/0872; F16H 2007/0893; F16H 2007/0804; F16H 7/18
See application file for complete search history.

(56) References Cited

U.S. PATENT DOCUMENTS 4,921,472 A * 5/1990 Young ..................... F16H 7/08
474/111
5,318,482 A   6/1994 Sato et al.
(Continued)

FOREIGN PATENT DOCUMENTS

EP     1182378 A2   2/2002
EP     1441149 A1   7/2004

*Primary Examiner* — Michael R Mansen
*Assistant Examiner* — Mark K Buse
(74) *Attorney, Agent, or Firm* — Volpe and Koenig P.C.

(57) ABSTRACT

A chain-tensioning rod, for an internal combustion engine with an overhead camshaft valvetrain to keep in tension a timing chain, includes a shoe, which is pressed against the timing chain, and a supporting arm of the shoe, allows a simple assembly of the arm and of the relative shoe because the shoe is formed by a monolithic piece having, on one side thereof, a sliding surface and on, the opposite side, a supporting surface and a contact element connected to the supporting surface by a longitudinal central rib; and the supporting arm is formed by an elongated sheet having a longitudinal pass-through slit extending from a distal end thereof, wherein it is open, so that insertion of the supporting arm on the supporting surface takes place by making said rib to slide in the slit, the rib operating as transversal locking device of the supporting arm on the supporting surface.

12 Claims, 2 Drawing Sheets

(56) References Cited

U.S. PATENT DOCUMENTS

| | | |
|---|---|---|
| 7,951,029 B2 | 5/2011 | Oota et al. |
| 2002/0045503 A1* | 4/2002 | Young ................. F16H 7/08 |
| | | 474/111 |
| 2003/0139237 A1* | 7/2003 | Konno ................ F16H 7/18 |
| | | 474/111 |
| 2005/0277506 A1* | 12/2005 | Konno ................ F16H 7/18 |
| | | 474/111 |
| 2013/0210566 A1* | 8/2013 | Konno ................ F16H 7/18 |
| | | 474/111 |
| 2015/0024889 A1* | 1/2015 | Konno ................ F16H 7/18 |
| | | 474/111 |
| 2018/0094708 A1* | 4/2018 | Ikeda ................. F01L 1/022 |

* cited by examiner

CHAIN-TENSIONING ROD

The present invention is related to a chain-tensioning rod of the type used in an internal combustion engine to keep in tension the timing chain, that is the chain transferring the motion from the crankshaft to the camshaft in a so-called overhead camshaft engine.

For instance, as timing chain can be meant a roller chain, which is engaged with toothed wheels: pinion and crown.

On the contrary, this type of rod generally comprises a portion, called shoe, made of resin, which is hinged at its own end and it is pressed against the outer surface of a chain or a timing belt to implement the best tensioning thereof, needed to guarantee the maximum precision in the actuation of the camshaft.

The shoe resin is selected so as to guarantee the minimum friction in the pressing site, but it is not a suitable material to guarantee the required mechanical integrity of the rod.

For this reason, the chain-tensioning rod comprises a metallic arm, thereby said hinge is made and supporting the shoe.

It is meant that the assembly simplicity and the overall resistance of the chain-tensioning rod are unavoidable requirements in the design of this mechanical element.

Furthermore, in order to decrease the internal inertia of the transmission mechanism, the rod has to be as much as light and elastic as possible.

European patent No. 1,441,149 describes a chain-tensioning rod wherein the assembly between the two above-described elements is guaranteed by giving a particular shape to the contact element thereon an outer mechanical organ exerts the required pressure on the rod. The rod arm is thus constituted by a solid metallic strip, fixed laterally to the shoe.

This asymmetrical hook-like shape implements an insertion of the arm into the shoe thanks to a rotary motion with a certain complexity and even makes the entire set unstable, both due to the asymmetry and as the arm is not constrained to the shoe for the whole length thereof.

U.S. Pat. No. 5,318,482 describes a chain-tensioning rod wherein the contact element, in order to allow the assembling with the arm, is not constructed as single piece with the shoe but it is a detached portion, which has to be connected to the shoe by fixing the arm thereto. The metallic arm has a complex shape and provides a central opening and perpendicular raised edges which are complementary to the shape of the shoe. This much more complex solution, then, comprises an intrinsic weakness in the fastening thereof between said two portions.

In U.S. Pat. No. 7,951,029, the shoe is embodied by a laminar insert mounted on an arm having a complex shape, thanks to a longitudinal guide obtained on the rear surface of the shoe. However, such solution results to be very complex and then even very expensive.

US patent application No. 2013/0210566, instead, describes a single-piece shoe comprising, at the area in contact with the chain, a strip made of synthetic material inserted in a longitudinal guide. Even this solution is very complex as the previous one.

U.S. Pat. No. 4,921,472 A describes a shoe with supporting arm, which is constrained to the shoe at the two ends thereof, by determining some difficulties in the assembly of the two portions.

The technical problem underlying the present invention is to provide a chain-tensioning rod allowing to obviate the drawbacks mentioned with reference to the known art.

Such problem is solved by a chain-tensioning rod as above specified, characterizing in that:

the shoe is formed by a monolithic piece having, on one side thereof, a sliding surface and, on the opposite side, a supporting surface and a contact element, which is connected to the supporting surface at a central portion of the shoe by means of a connecting rib longitudinally developing along the supporting surface and at the centre thereof, the supporting surface extending from a proximal end, thereat the chain-tensioning rod is hinged, and a distal end;

the supporting arm is formed by an elongated blade having a longitudinal pass-through slit, extending from a distal end thereof, wherein it is open, for at least half length of the supporting arm, so that the insertion of the supporting arm on the supporting surface takes place by making the supporting arm to slide on the supporting surface from said proximal end, by inserting said connecting rib into said slit, the connecting rib operating as a transversal central locking device of the arm on the supporting surface.

The main advantage of the chain-tensioning rod according to the present invention lies in allowing a simple assembly of the arm and of the relative shoe.

Furthermore, it allows greater flexibility and lightness, but even a greater freedom in selecting the constraints between arm and shoe, with the possibility for the latter to assume different shapes.

The present invention will be described hereinafter according to a preferred embodiment example thereof, provided by way of example and not for limitative purposes by referring to the enclosed drawings wherein.

By referring to figures, a chain-tensioning rod is designated as a whole with 1. It is of the type which is used in an internal combustion engine with overhead camshaft valve-train, to keep tensioned the timing chain transferring the motion from a pinion connected to the crankshaft to another wheel, called crown, connected to the camshaft.

In the present embodiment, the rod 1 has an elongated shape extending between a proximal end 2, thereat the rod 1 is hinged inside the engine, and a distal end 3.

Figure 1:
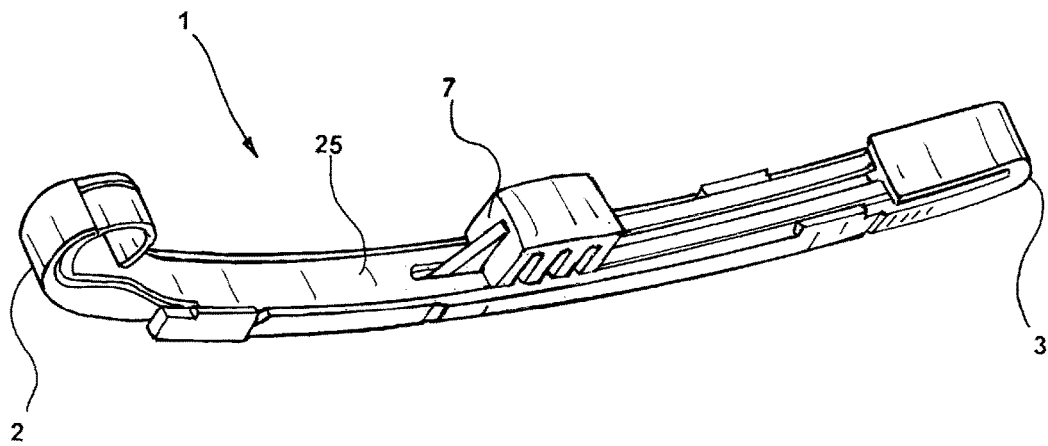
FIG. 1 shows a perspective view of an assembled chain-tensioning rod according to the invention.
Figure 2:
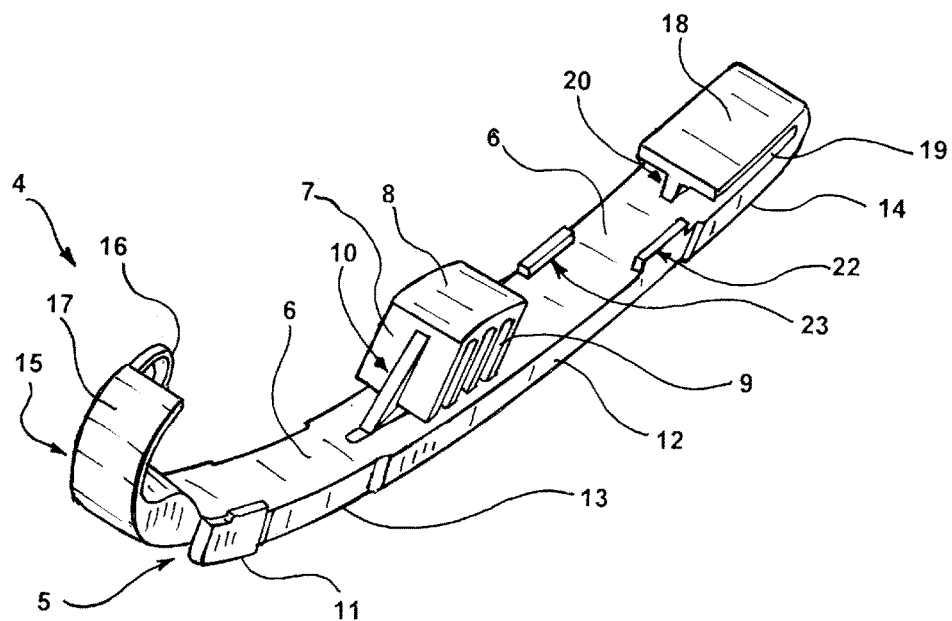
FIG. 2 shows a perspective view of the shoe of the chain-tensioning rod of FIG. 1.

The rod 1 is substantially embodied by two distinct portions. A first portion relates to a shoe 4 (FIG. 2) generally made of a synthetic material, particularly of resin, allowing to implement a low friction with the outer surface of the transmission chain.

The shoe 4 is pressed by an actuator (not shown) so that it exerts a pressure on the chain, thus by keeping it in tension.

The shoe is formed by a monolithic piece in resin, produced by injection moulding, and it has a smooth sliding surface 5 at one exposed side of the rod 1. Such surface can be delimited by longitudinal raised edges 11, which thus define a guide for the chain.

Along its extension, the shoe 4 has a central portion 12 with a larger width and two end portions 13 and 14 with a slightly smaller width.

On the opposite side, the shoe 4 has a supporting surface 6 thereat it is pressed by said actuator. The supporting surface 6 substantially extends from the proximal end 2 to the distal end 3 of the rod 1.

To this purpose, in a central position, on such supporting surface 6 it comprises a contact element 7 with a parallelepiped shape and a contact face 8 spaced apart and parallel to the supporting surface 6.

It is to be noted that the contact element 7 is not a solid block of material, but it has lightening side grooves 9.

The contact element 7 is supported in a raised position with respect to said supporting surface 6, being connected thereto by means of a first connecting rib 10, longitudinally developing along the supporting surface 6 and in a central position with respect thereto, rising perpendicularly and thus constituting the central core of the contact element 7.

At the proximal end 2, the shoe 4 comprises an eyelet-like portion 15 formed by two portions projecting from the proximal end portion 13. They form, respectively, an eyelet 16, with a circular opening the axis thereof is perpendicular to the development of the rod 1, and a curved wall 17 representing the extension of the supporting surface 6.

The eyelet 16 is formed by a holed wall extending from a longitudinal margin of the supporting surface 6 at the proximal end 2.

On the contrary, at the distal end of the rod 1, the shoe comprises a hook-like portion 18 formed by a wall which, extending from the supporting surface 6, folds by 180° by forming a recess 19 between itself and the supporting surface 6.

Said wall is further connected to the supporting surface 6 by a second connecting rib 20, which, like the first one, longitudinally develops along the supporting surface and in a central position with respect thereto, perpendicularly rising and thus constituting the central core of the hook-like portion 18.

At the outer margins of the supporting surface 6, the shoe 4 comprises stopping elements: edging tracts rising from said margins perpendicularly to the surface 6.

In particular, the shoe 4 comprises a proximal stopping element 21 on the proximal end portion 13, the position thereof is placed on the opposite margin with respect to the one whereon said eyelet-like portion 16 is placed.

The shoe described so far further comprises a pair of distal stopping elements 22, 23, arranged on opposite margins of the supporting surface 6. These distal stopping elements 22, 23 are staggered therebetween and, as it will appear clearly hereinafter, together with the proximal stopping element 21 and the two connecting ribs 10, 20, constitute guides of the arm of the chain-tensioning rod 1.

It is to be noted that all portions described so far in relation to the shoe 4 are integral therewith and constitute one single monolithic piece.

The second one of said portions constituting the rod 1 is then a supporting arm 25 which is formed by an elongated blade obtained from a curved band with substantially constant thickness, made of metal, for example harmonic steel.

Figure 3:
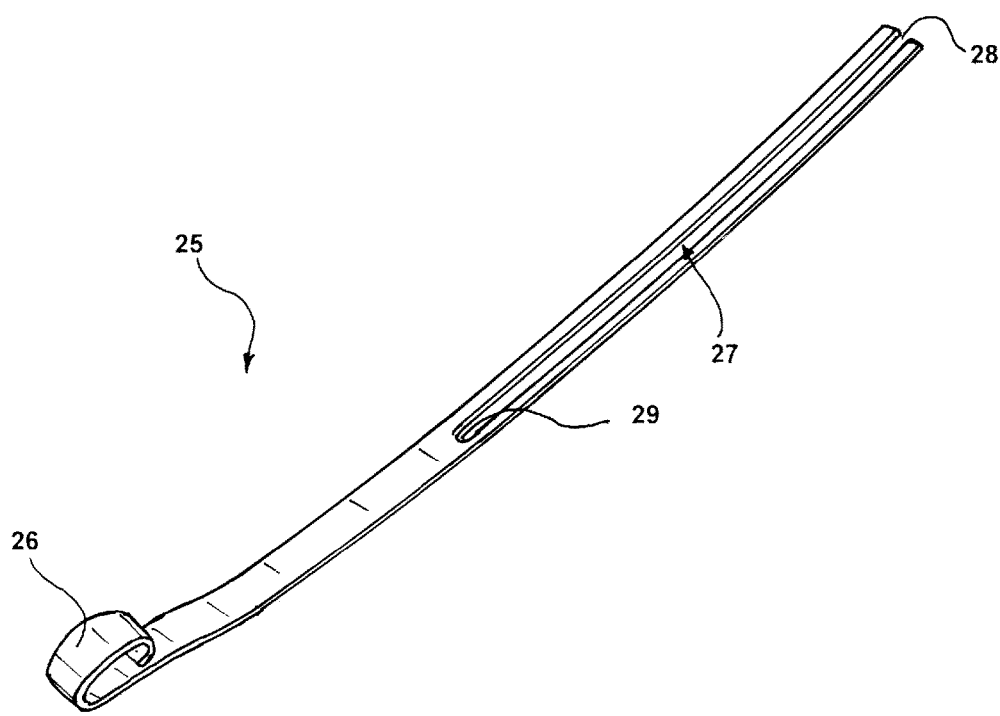
FIG. 3 shows a perspective view of the arm of the chain-tensioning rod of FIG. 1.

Even the supporting arm 25 (FIG. 3) is monolithic, obtained by punching and finishing from an unfinished metallic piece.

the supporting arm 25 in turn extends between the opposite ends and it comprises, at the proximal end, a ring-like shape 26 apt to couple with the eyelet-like portion 15 to form therewith a hinge element apt to be engaged by a (not represented) pin connected to the engine.

The arm 25 then comprises a longitudinal pass-through slit 27 extending from the distal end, wherein the slit is open, having then an inlet mouth 28, for at least half length of the arm 25. The slit 27 extends between said distal end for at least half length of the supporting arm 25, so as to be able to extend from the distal end 3 of the shoe as far as including the whole first rib 10 of the contact element 7.

The slit 27 has a constant width, it is positioned symmetrically in a central position with respect to the arm 25, and ends with a stopping end 29.

Figure 4:
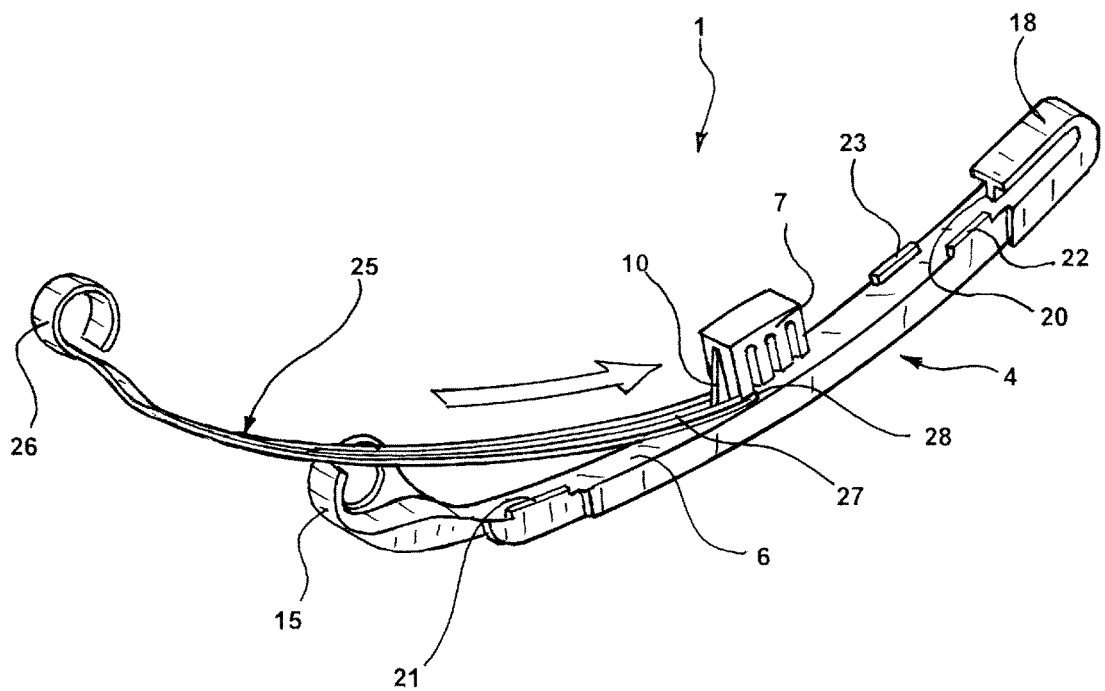
FIG. 4 shows a perspective view illustrating an assembly phase between arm and shoe of the previous figures.

The insertion of the supporting arm 25 on the supporting surface 6 of the shoe 4 takes place as shown in FIG. 4.

The arm 25 and the shoe 4 are overlapped, so that the extrados of the arm 25 is in contact with the proximal end portion 13 of the shoe 4. The overlapping takes place by making the supporting arm 25 to slide on the supporting surface 6 from the proximal end 2 of the rod 1, until the first connecting rib 10 of the contact element 7 is inserted in the mouth of the slit 27 and it is made to slide as far as even the second rib 20 enters the slit 27.

As the sliding continues, the distal end of the arm 25 inserts inside the hook-like portion 18 reaching the end thereof; furthermore, the stopping end 29 of the slit 27 is in contact with the first rib 10 and, at last, the ring 26 couples with the eyelet-like portion 15.

It is to be noted that, in this coupling process, arm 25 and shoe 4 translate longitudinally one with respect to the other one, without having to resort to rotations of any type.

With this insertion, the first connecting rib 10 acts as transversal and central locking device of the arm 25 on the supporting surface 6 of the shoe 4.

To the above-described chain-tensioning rod a person skilled in the art, with the purpose of satisfying additional and contingent needs, could introduce several additional modifications and variants, however all within the protective scope of the present invention, as defined by the enclosed claims.

The invention claimed is:

1. A chain-tensioning rod (1), for an internal combustion engine with an overhead camshaft valvetrain to keep in tension a timing chain, comprising a shoe (4), which is pressed against the timing chain, and a supporting arm (25) of the shoe, wherein:

the shoe (4) is formed by a monolithic piece having, on one side thereof a sliding surface (5) and, on the opposite side, a supporting surface (6) and a contact element (7), which is connected to the supporting surface (6) at a central portion of the shoe (4) by means of a connecting rib (10) longitudinally developing along the supporting surface (6) and in a center thereof, the supporting surface (6) extending from a proximal end (2), from which the chain-tensioning rod is hinged, and a distal end (3);

the supporting arm (25) is formed by an elongated blade having a longitudinal pass-through slit (27) extending from a distal end thereof, wherein it is open, for at least half length of the supporting arm (25), so that the insertion of the supporting arm (25) on the supporting surface (6) takes place by making the supporting arm (25) to slide on the supporting surface (6) from said proximal end (2), by inserting said connecting rib (10) into said slit (27), the connecting rib (10) operating as a transversal locking device of the supporting arm (25) on the supporting surface (6).

2. The chain-tensioning rod (1) according to claim 1, wherein the contact element (7) is supported in a raised position with respect to said supporting surface (6) from the connecting rib (10), which perpendicularly rises and constitutes a central core of the contact element (7).

3. The chain-tensioning rod (1) according to claim 2, wherein the contact element (7) has a parallelepiped shape and a contact face (8) spaced apart and parallel to the supporting surface (6).

4. The chain-tensioning rod (1) according to claim 1, wherein, at a proximal end thereof (2), the shoe (4) comprises an eyelet-like portion (15); and wherein the supporting arm (25) comprises, at said proximal end (2), a ring-like shape (26) configured to couple with the eyelet-like portion (15) to form therewith a hinge element configured to be engaged by a pin connected to the engine.

5. The chain-tensioning rod (1) according to claim 4, wherein the eyelet-like portion (15) is formed by two projecting portions and forming (16), respectively, an eyelet, with a circular opening the axis thereof being perpendicular to the development of the chain-tensioning rod (1), and a curved wall (17) representing the extension of the supporting surface (6), respectively; the eyelet 16 being formed by a holed wall extending from a longitudinal margin of the supporting surface (6) at the proximal end (2) of the chain-tensioning rod.

6. The chain-tensioning rod (1) according to claim 1, wherein, at a distal end (3) of the chain-tensioning rod (1), the shoe (4) comprises a hook-like portion (18) formed by a wall which, extending from the supporting surface (6), folds by 180° by forming a recess (19) between itself and the supporting surface (6).

7. The chain-tensioning rod (1) according to claim 6, wherein the hook-like portion (18) is connected to the supporting surface (6) by an additional longitudinal and central connecting rib (20), configured to be inserted in said slit (27) of the supporting arm (25).

8. The chain-tensioning rod (1) according to claim 1, wherein, at outer margins of the supporting surface (6), the shoe (4) comprises stopping elements formed by edging tracts rising from said margins perpendicularly to the supporting surface (6).

9. The chain-tensioning rod (1) according to claim 8, wherein the shoe (4) comprises a proximal stopping element (21) on its own proximal end portion (13), the position thereof is placed on the margin opposite to that of said eyelet.

10. The chain-tensioning rod (1) according to claim 8, wherein the shoe (4) comprises a pair of distal stopping elements (22, 23), arranged on opposite margins of the supporting surface (6), staggered therebetween.

11. The chain-tensioning rod (1) according to claim 1, wherein the slit (27) has a constant width, it is positioned symmetrically in central position with respect to the supporting arm (25), and ends with a stopping end (29) which comes in contact with said rib (10).

12. The chain-tensioning rod (1) according to claim 1, wherein said supporting arm (25) is made of harmonic steel.

* * * * *